United States Patent
Derner et al.

[11] 3,713,712
[45] Jan. 30, 1973

[54] HOLLOW ENDED BEARING ROLLER

[75] Inventors: William J. Derner, Manlius; Harold E. Stewart, Central Square; Lawrence E. Root, Jamesville; Roger A. Goodelle, Liverpool, all of N.Y.

[73] Assignee: Rollway Bearing Company, Inc., Liverpool, N.Y.

[22] Filed: March 29, 1971

[21] Appl. No.: 128,983

[52] U.S. Cl. ............................................. 308/215
[51] Int. Cl. .............................................. F16c 33/00
[58] Field of Search .................... 308/215, 202, 212

[56] References Cited
UNITED STATES PATENTS 1,572,725   2/1926   Keller, Sr. ............................ 308/215

*Primary Examiner*—Milton Kaufman
*Assistant Examiner*—Frank Susko
*Attorney*—Bruns & Jenney

[57] ABSTRACT

A hollow ended roller element for use in radial and thrust bearings, the roller being crowned and formed with cavities in both terminal planes. The configuration of the cavities is such that unequal forces created by an excessive misalignment are more evenly distributed whereby the useful life of the bearing is extended.

3 Claims, 2 Drawing Figures

PATENTED JAN 30 1973

3,713,712

INVENTORS.
WILLIAM J. DERNER, HAROLD E. STEWART
LAWRENCE E. ROOT & ROGER A. GOODELLE
BY
*Bruns & Jenney,*
ATTORNEYS

3,713,712

HOLLOW ENDED BEARING ROLLER

BACKGROUND OF THE INVENTION

This invention relates generally to anti-friction roller bearings, and has particular reference to an improved bearing roller having a relatively high bearing misalignment tolerance.

In roller radial and thrust bearings, it has been found that shaft and housing misalignments cause early fatigue of the roller elements as well as the bearing races or plates. Thus, an excessive misalignment causes non-uniform loading of the rollers and this in turn causes uneven contact stress distribution such that the stresses may be low in one area of the rollers and extremely high in another. The high stress concentration in a restricted area of the rollers causes excessive compression or deformation resulting in premature fatigue and often in destructive failure.

It is known that if the stresses placed on the bearing components are kept within the endurance limit of the materials, the life of the bearing will be extended almost indefinitely. Many attempts have been made to design bearings to achieve this objective, but most of the proposed solutions have introduced other disadvantages. For example, spherically ground, mating thrust plates have been employed to reduce the effects of misalignment, as have crowned rollers. The spherical plates offer a good solution but they are additional parts requiring more space and a higher cost. Crowning the rollers is effective only within a narrow range of misalignment tolerance.

SUMMARY OF THE INVENTION

The bearing rollers of the present invention are crowned and are also formed with terminal plane cavities of a particular, predetermined configuration. This combination has proved effective in substantially increasing the misalignment tolerance of bearings using the rollers. The flexibility of the hollow ended cylindrical rolling elements enables the rollers carrying the greatest load to deform sufficiently to redistribute the load, with greater load sharing among all the rollers. This reduces the severity of the contact stresses, improving the fatigue life of the bearing.

Where a high degree of bearing stiffness (spring rate) is required as well as a substantial tolerance to misalignment, the hollow ended roller provides a solution midway between solid and completely hollow rollers. The deflection of the ends of these rollers allows greater load sharing among the rollers and shifts the peak contact stresses to the solid center portions thereof. The result is a decrease in the peak contact stress magnitude without completely sacrificing the spring rate.

DESCRIPTION OF THE PREFERRED EMBODIMENTS

Figure 1:
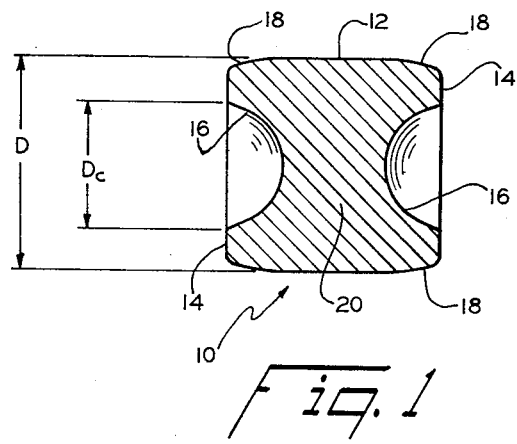
FIG 1 is a central, longitudinal section through a roller element embodying the invention.

Referring now to the sectional view of FIG 1, the roller to be described herein is generally indicated by reference number 10 and is formed from a solid right cylinder having a rolling surface 12 and terminal planes or end faces 14. In accord with the invention, the end faces are recessed to form cavities 16 that are concentric with the rolling surface. In addition, the rolling surface is crowned adjacent the roller end faces, as shown at 18, whereby the diameter of the end faces is slightly less than that of the solid center portion 20 of the roller.

Figure 2:
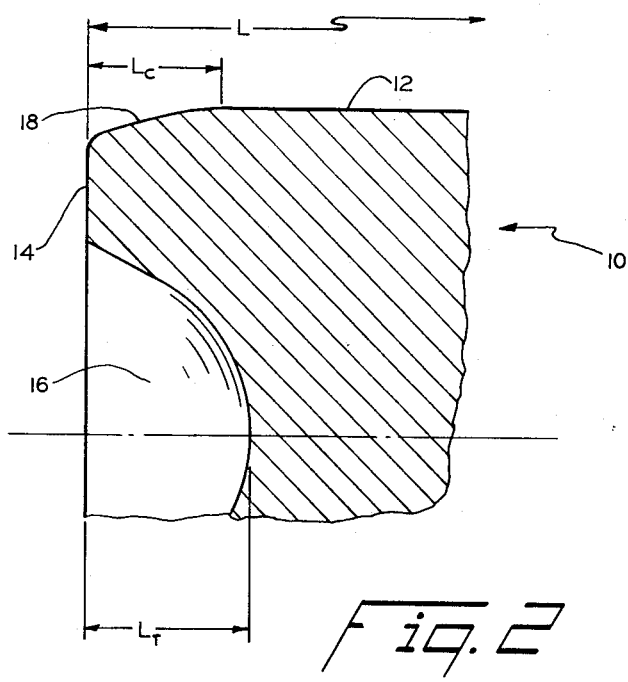
FIG 2 is an enlarged, fragmentary section corresponding to the upper left hand portion of FIG 1.

The crowing in conjunction with the recessed end faces insures a uniform load distribution pattern and, in the embodiment shown the length $L_c$ of each crowned portion 18 of the roller is preferably 15–20 percent of the total length L of the roller; see FIG 2.

The walls of the cavities 16 are curvilinear surfaces, and the end face diameter and depth of the cavities are determined so as to provide the roller with the deflection characteristics required to accommodate a particular degree of misalignment between the bearing housing and shaft. To this end, in the roller disclosed herein the cavity diameter $D_c$ at the roller end faces is 50–59 percent of the maximum roller diameter D, see FIG. 1, and the cavity depth $L_R$ is from 0.8 to 1.2 times the crown length $L_c$, FIG. 2.

In addition to the relationships indicated above, the configuration of the curvilinear cavity walls is determined so that the roller in the areas of the cavities has a stress concentration factor of less than 2. Thus, these curvilinear surfaces may be essentially hemispherical or may be compound depending on the permissible length and diameter of the roller, the required spring rate and other factors related to the particular application of the bearing.

From the foregoing description, it will be apparent that the invention provides an improved hollow ended, crowned roller having a relatively high bearing misalignment tolerance. As will be understood by those familiar with the art, the invention may be embodied in other specific forms without departing from the spirit or essential characteristics thereof.

We claim:

1. An anti-friction roller element for use in a bearing, the roller element having a substantially cylindrical rolling surface and opposite end faces disposed in perpendicular relation to the longitudinal axis of the roller, the roller being formed with a crown portion adjacent each end whereby the diameter of each end face is less than the maximum diameter of the roller, the length of each crown portion being less than 25% of the roller length, and wherein the roller end faces are formed with centrally disposed cavities having a depth approximately equal to the length of the crown portions, the diameter of each cavity at the roller end face being from 50–59 percent of the maximum diameter of the roller.

2. An anti-friction roller element for use in a bearing, the roller element having a substantially cylindrical rolling surface and opposite end faces disposed in perpendicular relation to the longitudinal axis of the roller, the roller being formed with a crown portion adjacent each end whereby the diameter of each end face is less than the maximum diameter of the roller, the length of each crown portion being in the range of 15-20% percent of the length of the roller, and wherein the roller end faces are formed with centrally disposed cavities having a depth approximately equal to the length of the crown portions.

3. An anti-friction roller element for use in a bearing, the roller element having a substantially cylindrical rolling surface and opposite end faces disposed in perpendicular relation to the longitudinal axis of the roller, the roller being formed with a crown portion adjacent each end whereby the diameter of each end face is less than the maximum diameter of the roller, the length of each crown portion being in the range of 15–20 percent of the length of the roller, and wherein the roller end faces are formed with centrally disposed cavities having a depth of from 0.8 to 1.2 times the length of each crown portion.

4. In an anti-friction bearing, a roller element having a substantially cylindrical rolling surface and opposite end faces perpendicular to the longitudinal axis of the roller, the roller being formed with a crown portion adjacent each end, the length of each crown portion being from 15 to 20 percent of the roller length, the end faces of the roller being formed with centrally disposed cavities having curvilinear walls, the diameter of each cavity at the roller end face being from 55 to 59 percent of the maximum diameter of the roller and the depth of each cavity on the longitudinal axis of the roller being from 0.8 to 1.2 times the length of a crown portion, and wherein the configuration of the cavity walls is such that the roller in the areas of the cavities has a stress concentration factor of less than 2.

* * * * *